2 Sheets—Sheet 1.

W. H. PALMER.
CRACKER-MACHINE.

No. 174,564. Patented March 7, 1876.

WITNESSES:
John Everding
W. R. Wright

W. H. Palmer
INVENTOR.
By David A. Burr
ATTORNEY.

N. PETERS, PHOTO-LITHOGRAPHER, WASHINGTON, D. C.

W. H. PALMER.
CRACKER-MACHINE.

No. 174,564.    Patented March 7, 1876.

2 Sheets—Sheet 2.

WITNESSES:
W. R. Wright
John Everding

W. H. Palmer
INVENTOR.
By David A. Burr
ATTORNEY.

UNITED STATES PATENT OFFICE.

WILLIAM H. PALMER, OF PHILADELPHIA, PENNSYLVANIA.

IMPROVEMENT IN CRACKER-MACHINES.

Specification forming part of Letters Patent No. 174,564, dated March 7, 1876; application filed December 8, 1875.

*To all whom it may concern:*

Be it known that I, WILLIAM H. PALMER, of Philadelphia, State of Pennsylvania, have invented a new and useful Improvement in Cracker-Machines, which improvement is fully set forth in the following specification, reference being had to the accompanying drawings.

My invention relates to an improvement in the manufacture of water-crackers, by cutting and compressing the dough, after it has passed in strips from the rollers, transversely to the length of the strips, and of so depositing the cut bits of dough upon the apron or table whereon they are to be compressed as that there shall be full open space around each piece to admit of its spreading into proper shape without coming into contact with the adjacent pieces; and the invention consists in the use of a knife for cutting the dough as it passes in strips from the rollers, whose front edge is formed with alternate notches and projections of equal width, the end of each projection and the bottom of each notch being shaped and sharpened to form a suitable cutter; and in the combination, with said knife, of movable forks arranged to close from opposite directions upon the several bits of dough as they are cut, and to retain them in position for compression until the knife is withdrawn and the pressing-block is brought to bear thereon.

Figure 1:
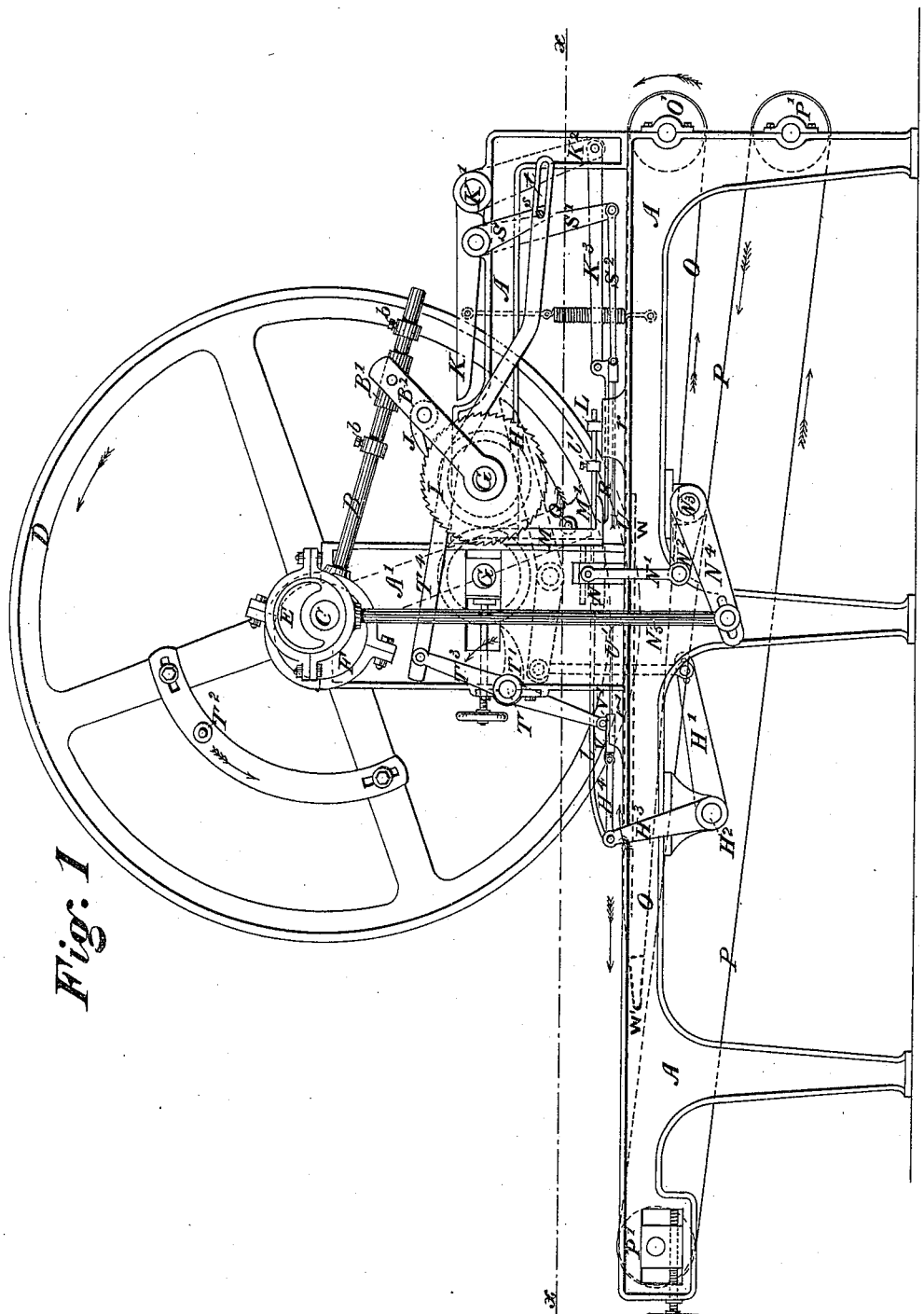
Figure 2:
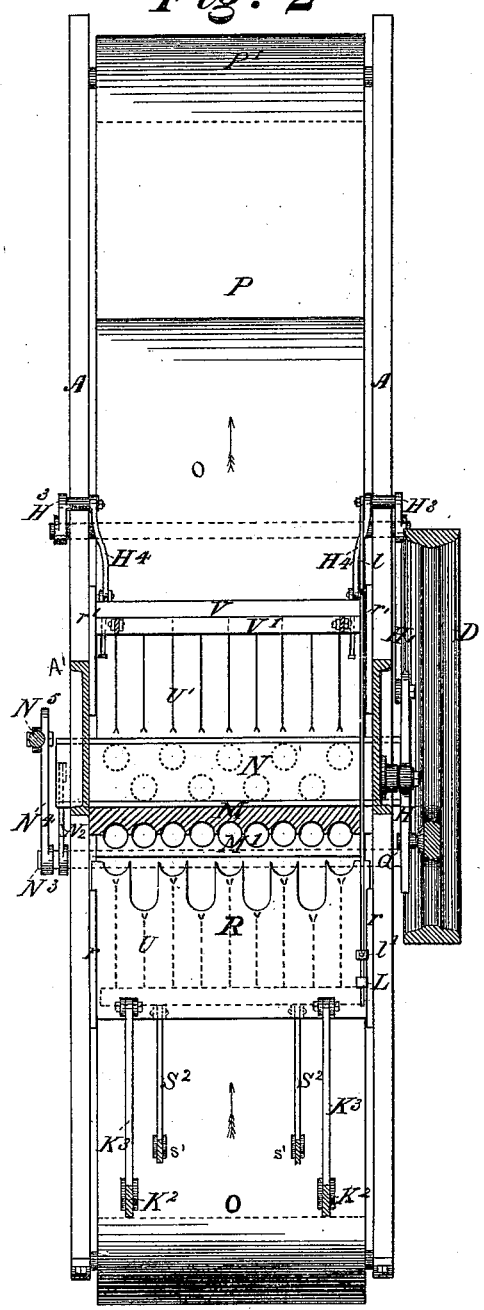
Figure 3:
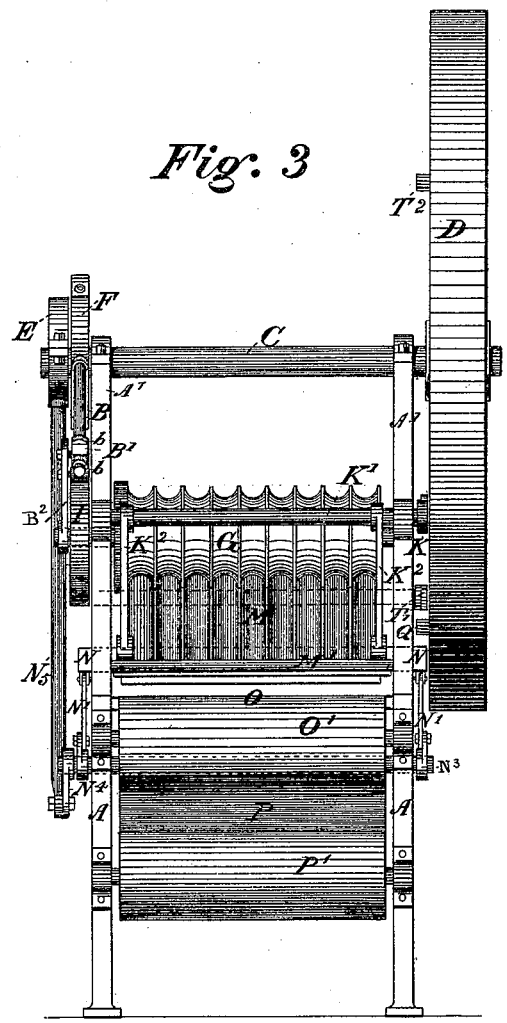

In the accompanying drawings, Figure 1 is a side elevation of my improved cracker-machine, parts which are concealed being indicated by dotted lines; Fig. 2, a sectional view in line *x x* of Fig. 1, giving a plan view of the knife and apron, &c.; and Fig. 3 is an end view of the machine from the rear.

A A A is the frame-work of the machine. A' A' are uprights supporting the driving-shaft; C, the driving-shaft, supported at either end in suitable journal-boxes upon the uprights A' A'; D, a large band-wheel, secured upon one end of the shaft C, and serving also as a fly-wheel; E F, eccentrics secured upon the opposite end of the shaft C to operate, respectively, the feed-rollers and the pressing-block of the machine; G G, parallel grooved rollers, whose journals at each end revolve in pillow-blocks arranged to slide in the frame-work, so as to admit of horizontal adjustment by means of set-screws. The grooves in the rollers are of the width required in the strips of dough to be cut up into crackers, and are formed without interspaces, (see Fig. 3,) so that a sheet of dough fed in between them is wholly cut into strips to fill the grooves, without any waste whatever. The two rollers are geared together, so that they shall revolve in unison, by means of intermeshing cogged wheels formed upon one end thereof. (See Fig. 3). I is a ratchet-wheel secured to the projecting end of the journal of one of the rollers, outside the frame, and J a pawl engaging it, pivoted to a lever, $B^2$, swinging upon the same journal. (See Fig. 1.) B is a rod secured to a band revolving upon the eccentric F. This rod B works freely through a sleeve, $B^1$, pivoted to the outer end of the swinging pawl-lever $B^2$, as shown in Fig. 1, and *b b* are adjustable stops upon the rod B, fastened by set-screws, one on either side of the sleeve $B^1$, to regulate the movement of the pawl-lever $B^2$. M is a metallic guide-apron or guard, grooved (see Figs. 2 and 3) to correspond with the grooves in the feed-rollers G G, and placed vertically on a right line coincident with the intersecting-line of the rollers, so as to receive the dough as it drops from between them, and protect it until it passes to the knife. This apron M terminates in a horizontal shoe, M', which projects therefrom at a short distance above the table of the machine, the shoe being perforated at its intersection with the apron (see Fig. 2) so as to leave an opening in a right line with each groove. O is an endless apron of cloth, tightly stretched, and moving over a horizontal table, W, fixed between the sides of the frame-work. (See dotted lines, Fig. 1.) The front end of the table W terminates within the frame, with a slight incline or bevel, which is protected and finished with an iron shoe, W'.

The apron O passes around the smooth rounded edge of the iron shoe at the front end of the table, and thence back under the table to and over a roller, $O^1$, supported in the frame-work at the rear end. (See Fig 1.) P is a second endless apron passing over rollers P' P' at each end of the frame-work, in such position (see Fig. 1) as that the apron shall incline upward from rear to front and pass under the front end of the table, and of the endless apron O, so that the crackers delivered from the latter as it turns under the end of the table shall drop into pans placed upon and carried forward by the former, the movement of the aprons O and P being produced in unison with the movements of the knife and presser-block by means of suitable gearing connecting the main shaft C with the rollers O' and P'. N is a presser-block extending across the table L, in front of the apron M, and so guided at either end in suitable ways formed in or upon the uprights A' A' of the frame as to admit of vertical adjustment therein. $N^1 N^1$ are arms secured to the ends of the presser-block M, and depending therefrom on either side of the table, outside of the frame. The lower end of each arm $N^1$ is pivoted to a lever, $N^2$, (see Fig. 1) projecting horizontally from a rock-shaft, $N^3$, supported in suitable bearings under the table. The shaft $N^3$ is made to rock in its bearings by means of a lever, $N^4$, secured thereto, and whose outer end is pivoted to a vertical rod, $N^5$, secured to a band encircling the eccentric E on the driving-shaft C. The rocking of the shaft $N^3$, oscillating the levers $N^2 N^2$ at each end thereof, operates to depress the pressure-block N upon the table, and again to elevate it therefrom. R is my improved knife for cutting the dough. This knife traverses horizontally under the shoe M', being supported at each end in suitable ways $r\ r$. The front or blade thereof is formed into a series of semicircular or concaved cutting-edges, each corresponding to the opposite groove in the guide-plate M, every other cutting-edge being set back a distance equal to that required between the bits of dough when dropped under the presser block. (See dotted lines, Fig. 2,) $K^1$ is a rock-shaft, from which an arm, K, projects horizontally toward the fly-wheel D, so as to be struck and thrown upward by a pin, Q, upon arm thereof. $K^2 K^2$ are arms projecting downward at a suitable angle (see Fig. 1) from the shaft $K^1$, at each end thereof inside the frame, and $K^3$ are rods pivoted to the lower ends of the arms $K^2$, and to the rear edge of the knife so that when the arm $K^1$ is struck by the pin Q on the fly-wheel D, and thrown up thereby, the rocking movement of the shaft $K^1$ will operate to throw the knife forward far enough to cut the dough, its return being obtained automatically, so soon as its forward movement is completed, by the action of a spring attached to the arm K, as shown in Fig. 1. A series of forks, or forked wires, U, one for each cutting-edge, are secured to a transverse bar, sliding in ways parallel to the ways of the knife-blade, so as to extend under the latter. These forks are so arranged and adjusted in length as that they will terminate respectively at the cutting-edges of the knife, (see dotted lines, Fig. 2,) and strike the dough simultaneously therewith. The forward movement of this set of forks is made to take place simultaneously with the forward movement of the knife, by means of a projection on the rear end of the knife, which engages the sliding bar to which the forks are secured, but which is disengaged so soon as the knife moves back, so that the forks will remain to support the bits of dough after the knife is withdrawn and until they are seized by the presser-plate N. The forks are then withdrawn automatically by the action of a pin, $T^2$, on the fly-wheel striking a cam-tooth, $T^1$, projecting from one end of a rock-shaft, T, placed above the table at the front of the frame. The movement of this cam $T^1$, by causing a partial revolution of the shaft T, operates to swing back an arm, $T^3$, secured to the other end of said shaft, and which, projecting upward therefrom outside the frame, is connected by a suitable bent rod, $T^4$, with an arm, S, projecting downward outside the frame from the end of a second rock-shaft extending across the frame at the rear thereof, and carrying two arms, $S^1 S^1$, which, projecting from either end thereof inside the frame, are connected with the fork-bar by simple rods $S^2 S^2$, all as fully illustrated in Fig. 1.

The connection of the reciprocating rod $T^4$ with the outer arm S of the second rock-shaft is made by means of a pin, $s$, on the arm passing into a longitudinal slot, $t$, in said rod, (see Fig. 1,) so that a reverse movement of the rod shall simply withdraw and disengage the end of the slot $t$ from its contact with the pin $s$ without moving it, the movement of the forks when carried forward by the knife serving to restore the pin $s$ to its position of contact, in readiness to be actuated by the next movement of the rod, as described. An opposite set of forks, $U\ U^1$, (see Fig. 2,) are arranged to move against the bits of dough from the front side. These are secured alternately to two sliding bars, V V', which both traverse horizontally in the same ways, and are thrown back simultaneously to carry the forks against the dough in front of the knife R, by means of arm $H^3$ projecting outside the frame on each side, from a rock-shaft, $H^2$, extending across the frame below the table, the proper movement of the rock-shaft $H^2$ being obtained at the desired moment by means of the tooth Q on the fly-wheel D, which strikes one end of a centrally-pivoted lever, H, (see dotted lines Fig. 1) whose opposite end is connected, by means of a vertical rod or link, with the end of an arm, $H^1$, projecting from the rock-shaft $H^2$ at right angles to the arms $H^3$. When thus thrown back simultaneously the ends of the forks $U^1 U^1$ are all on the same right line, in front of the strips of dough. So soon, however, as the knife advances, all the forks opposite the projecting cutters are made to withdraw simultaneously with its advance, to carry and support the cut bits of dough forced forward thereby, by means of a rod, $l$, which extends from the upper end of the lever $H^3$ to a point at the side of the knife, where, passing through a suitable support, L, it is struck by a pin on the knife, which strikes against an adjustable stop, $l^1$, on the rod $l$, to carry it forward as the knife advances. This movement of the rod $l$, produced by the movement of the knife, actuates the arms $H^3$ $H^3$, and causes the set of forks secured to the front slide V to recede in advance of the knife until its forward movement is arrested. The rear slide $V^1$ is pivoted to the end of a lever projecting downward from the rock-shaft T, hereinbefore described, so that when said shaft is turned by the contact of the tooth $T^1$ on the fly-wheel, with the carn $T^1$, so as to throw forward the knife R, and with it, by means of the rod $l$, the slide V and rear forks, it will operate to carry forward and withdraw also the slide $V^1$ and all the front forks.

The operations of cutting alternate strips of dough as they reach the apron O on the table, of passing them under the presser-block N, withdrawing the knife R, withdrawing the forks U and $U^1$, compressing the bits of dough into cracker shapes, the descent of the presser-block N, the lifting of the presser-block while the knife is again moving forward, and the intermittent forward movement of the aprons O and P as the presser is lifted, all take place in regular consecutive order through a proper adjustment of the mechanism above described, so that the dough, fed in between the rollers G G, is cut and formed into raw cracker shapes continuously and uniformly, these raw crackers being deposited regularly from the upper aprons O into pans placed upon the lower apron P as the upper apron passes around the shoe $W^1$ at the front end of the table. The superiority of this improved machine, as compared with all others for the same purpose, is found in its singular compactness, the ease and rapidity of its operation, and in the fact that it cuts up and fashions into the desired shapes all the dough supplied thereto, without leaving any scrap or waste whatever.

I claim as my invention—

1. A knife for cutting cracker-bits from strips of dough, having its front edge formed of alternate recesses and projections, all equal in width, and each forming a cutting-edge, substantially as herein set forth.

2. The two series of forks U $U^1$ secured to the one and the other of two separate slides, traversing in parallel ways, and combined with the cutting and pressing mechanism of a cracker-machine, substantially as and for the purpose herein set forth.

3. The cutting-rollers circumferentially grooved without interspaces, arranged in pairs to revolve over toward each other, and combined in a cracker-machine with a grooved guide-plate, M, and with a knife, R, having two separate series of cutting-edges, all substantially as and for the purpose herein set forth.

WILLIAM H. PALMER.

In the presence of—
F. C. BATTELLE,
DAVID A. BURR.